United States Patent [19]

Nerurkar et al.

[11] 3,751,280

[45] Aug. 7, 1973

[54] METHOD OF PRODUCING A PHOTOGRAPHIC FILM BASE HAVING A SUBBING LAYER

[75] Inventors: Mohanial Shantaram Nerurkar; Paul Ernest Dawson, both of Welwyn Garden City, England

[73] Assignee: Imperial Chemical Industries Limited, London, England

[22] Filed: Feb. 1, 1971

[21] Appl. No.: 111,749

[30] Foreign Application Priority Data
Feb. 6, 1970 Great Britain............... 5,794/70

[52] U.S. Cl............... 117/7, 117/34, 117/47 A, 117/72, 117/81, 117/138.8 R, 117/138.8 E, 117/138.8 A, 96/87
[51] Int. Cl........ B29d 7/24, B44d 1/14, G03c 1/84
[58] Field of Search............... 117/34, 47, 7, 72, 117/138.8 F, 81; 96/87

[56] References Cited
UNITED STATES PATENTS

| 3,212,897 | 10/1965 | Secrist | 117/34 |
| 3,320,191 | 5/1967 | Secrist | 117/34 |
| 3,501,303 | 3/1970 | Foltz | 96/88 |
| 3,271,178 | 9/1966 | Nadeau et al. | 117/7 |
| 3,600,208 | 8/1971 | Abbott et al. | 117/7 |
| 2,779,684 | 1/1957 | Alles | 117/34 |
| 2,627,088 | 2/1953 | Alles et al. | 117/34 |
| 3,590,107 | 6/1971 | Smith et al. | 117/47 A |
| 3,576,658 | 4/1971 | Notomi et al. | 117/7 |
| 3,082,144 | 3/1963 | Haley | 117/34 |
| 3,508,944 | 4/1970 | Henderson et al. | 117/7 |
| 3,285,766 | 11/1966 | Barkis et al. | 117/7 |
| 3,535,147 | 10/1970 | White | 117/7 |

FOREIGN PATENTS OR APPLICATIONS

| 925,069 | 5/1963 | Great Britain |
| 986,923 | 3/1965 | Great Britain |

*Primary Examiner*—William D. Martin
*Assistant Examiner*—William R. Trenor
*Attorney*—Cushman, Darby & Cushman

[57] ABSTRACT

Coating of biaxially oriented polyester films with a subbing composition including a polymeric and a water-permeable component such as gelatin before the film is fully oriented.

9 Claims, No Drawings

METHOD OF PRODUCING A PHOTOGRAPHIC FILM BASE HAVING A SUBBING LAYER

The present invention relates to a method of coating a synthetic polymeric film for the production of a photographic film base and to the photographic film base produced.

It is known that photographic film bases may be produced from dimensionally stable films formed from hydrophobic synthetic polymeric materials, such as polyesters, e.g. polyethylene terephthalate, and polycarbonates. A light sensitive layer, formed for example from a gelatino silver halide emulsion, may be applied to the photographic film base. However, since the polymeric film is hydrophobic and the light sensitive layer is hydrophilic it is difficult to develop sufficient adhesion between the polymeric film and the light sensitive layer which will be maintained not only during the normal handling of the sensitive film but also through the wet processing operations to which it is subjected.

For this reason it has been common practice to coat the surface of the synthetic polymeric film, such as a polyethylene terephthalate film, after biaxial orientation and heat-setting, with one or more anchoring layers, often termed "subbing" layers, which adhere to the synthetic polymeric film and to which the light sensitive layer will adhere. For example, such polymeric films have been coated with a polymeric subbing composition which contains a copolymer or terpolymer of vinylidene chloride with, for example, an alkyl acrylate and an unsaturated organic acid. A gelatin subbing composition is generally applied over the polymeric subbing coating. The light sensitive layer has then been applied over the polymeric subbing coating, or if a gelatin subbing coating is also used, over that.

It has also been common practice to imporve the adhesion between the film base and the subbing coating applied to it by first treating the film surface with an oxidising agent such as an aqueous solution of potassium permanganate or solvent etching with e.g. o-chlorophenol.

As an alternative to applying the polymeric subbing coating after orientation and heat setting of the polymeric film, such a coating has been applied prior to or in between the two stretching operations employed to orient the film. However, it has not been common practice to apply a gelatin subbing coating prior to or in between the drawing operations.

In accordance with the present invention a method of producing a photographic film base comprises casting a flat polymeric film, molecularly orienting the cast film by stretching it in at least one direction and coating the film with a subbing composition comprising a polymeric component and a water permeable component prior to the completion of the molecular orientation.

The photographic film base produced according to the invention comprises a flat polymeric film, which has been molecularly oriented in at least one direction and coated with a subbing composition comprising a polymeric component and a water permeable component.

The polymeric film may be formed from any hydrophobic synthetic polymeric material, and should produce a dimensionally stable film after orientation and heat setting. Suitable polymeric materials include polyesters, e.g. polyethylene terephthalate, copolyesters and polycarbonates. Our preferred polymeric material is polyethylene terephthalate.

In order that the photographic image produced on the film base according to this invention should not become distorted, the polymeric film should be dimensionally stable under the normal conditions of use and photographic processing, e.g. development and fixing. Whilst it is envisaged that some uniaxially oriented polymeric films may be sufficiently dimensionally stable, it is normally necessary to biaxially orient the polymeric films to obtain the desired dimensional stability. When polyethylene terephthalate film is employed it is generally biaxially oriented.

Generally, biaxially oriented polymeric films may be oriented firstly by stretching in the longitudinal direction followed by stretching in the transverse direction. The biaxially oriented film may then be heat set by heating whilst restraining the film against shrinkage in the longitudinal and transverse directions. A further stretching in the longitudinal direction may be employed before or after heat setting to improve the tensile strength in the longitudinal direction.

An alternative method of improving the longitudinal tensile strength is to stretch firstly in the transverse direction and subsequently in the longitudinal direction.

A further method of biaxially orienting the film is to stretch it simultaneously in the longitudinal and transverse directions.

All of the above methods of biaxially orienting the polymeric film are known and may be employed in carrying out the present invention. Orientation is effected by stretching at a temperature below the softening temperature of the film but above its second order transition temperature.

A typical process which may be employed in the present invention for biaxially orienting polyethylene terephthalate film which has been cast on to a drum on which it has been quenched to below 80°C involves stretching the film at a temperature in the range 80° to 100°C in the longitudinal direction between two sets of fast and slow nip or capstan rollers which apply a draw ratio of 2.5:1 to 4.0:1 and stretching the film in the transverse direction at a temperature in the range from 80° to 120°C and above the temperature employed for stretching in the longitudinal direction. The stretching in the transverse direction may be effected in a stenter apparatus at a draw ratio of 2.5:1 to 4.0:1. The film is then heat set by heating at a temperature in the range 150° to 250°C for 0.5 to 5 minutes while being restrained from shrinkage in both directions, conveniently by holding the film with a stenter apparatus. The heat set film may then optionally be drawn in the longitudinal direction to improve its longitudinal tensile strength, at a temperature in the range 100° to 220° using a draw ratio of 1.5:1 to 3.0:1.

If the film is produced by a process in which it is stretched firstly in the transverse direction and then in the longitudinal direction so as to improve its longitudinal tensile strength it may be stretched at draw ratios of at least 3.3:1 in the transverse direction and from 3.0:1 to 6.0:1 in the longitudinal direction.

According to the present invention, the subbing composition is applied prior to the completion of the molecular orientation, that is the stretching operation or operations employed to orient the film. It may be applied before any orientation is effected, e.g. in the case of a biaxially oriented polyethylene terephthalate film, after the polymeric film has been cast on to the quenching drum and before the first stretching operation which will be in either the longitudinal or transverse direction, normally the former. Alternatively, for a biaxially oriented film which is made by stretching in sequence in two substantially mutually perpendicular directions the subbing composition may be applied between the stretching operation employed in each direction. Accordingly, if the film is stretched in the longitudinal direction first, then the subbing composition may be applied after stretching in the longitudinal direction but before stretching in the transverse direction. Conversely, if the film is stretched in the transverse direction first, then the subbing composition may be applied after stretching in the transverse direction but before stretching in the longitudinal direction. When a second stretching operation is effected in the longitudinal direction to improve the longitudinal tensile strength of the film the subbing composition may be applied before that stretching operation.

The techniques and apparatus adopted for applying the subbing composition to the film may consist of any techniques and apparatus known in the art.

It has been found that when a subbing composition is applied to the polymeric film in accordance with the present invention it is not necessary to pre-treat the surface of the film prior to subbing as has often been done in the past with, for example, an oxidising agent or a solvent etching agent. However, if desired, components of this nature may be included in the subbing composition as described below.

The polymeric component of the subbing composition may consist of any suitable synthetic polymer copolymer or terpolymer which provides an adequate adhesion to the polymeric film. One or more polymers or copolymers may be employed to form a composite polymeric component if desired.

A preferred group of copolymers suitable for forming the polymeric component of the subbing composition comprises copolymers of conjugated diolefines with one or more vinyl comonomers. The conjugated diolefine may for example be butadiene or isoprene and the vinyl comonomer or comonomers may be chosen from acrylonitrile, styrene, methyl methacrylate, methacrylic acid and itaconic acid. Terpolymers in which one of the vinyl comonomers is an unsaturated carboxylic acid, preferably itaconic acid, are particularly useful, for instance terpolymers of butadiene, styrene and itaconic acid as specified below have been found to be satisfactory. Itaconic acid is a useful constituent as it promotes adhesion to gelatin and therefore assists in developing a bond to a gelatin-containing layer which may be applied over the subbing layer.

The relative proportions of conjugated diolefine and vinyl comonomer or comonomers in the copolymer are chosen to provide a subbing composition which will not be impaired by the stretching operations used for the orientation of the film to which it is applied. Generally 10 to 50 mole percent, preferably 25 to 40 mole percent, of the conjugated diolefine is used. The proportion employed in practice depends upon the nature of the conjugated diolefine and the vinyl comonomer or comonomers. If too little conjugated diolefine is used the copolymer tends to be brittle and becomes hazy when the film to which it is applied is stretched. If too much conjugated diolefine is used the copolymer tends to be soft and the subbed film tends to block when it is reeled. When a terpolymer containing an unsaturated carboxylic acid such as methacrylic acid or itaconic acid is used the proportion of acid should not exceed 20 mole percent, the relative amounts of the terpolymer constitutents being such that the subbing composition is resistant to stretch haze and blocking. It has been found that terpolymers comprising 25 to 40 mole percent butadiene, 53 to 74.5 mole percent styrene and 0.5 to 7 mole percent itaconic acid are suitable polymeric components for the subbing compositions of the invention.

Alternatively, polymers, copolymers and terpolymers of a vinyl halogenoester or a vinyl cyanoester may be used as the polymeric component. Suitable materials are those disclosed in British Specifications 1,208,821 and 1,208,822. Preferably, copolymers or terpolymers of vinyl mono, di or tri-chloroacetate or vinyl mono, di or tri-bromoacetate are used which contain units derived from n-butyl acrylate; 2-ethoxyethyl acrylate; ethyl acrylate; 2-ethylhexyl acrylate; decyl methacrylate; octa decyl methacrylate; 2-ethylhexyl methacrylate; di-(polypropyleneoxy) itaconate; vinyl butyl ether; vinyl ethyl ether; vinyl methyl ether; vinyl isobutyl ether; vinyl stearate; vinyl versatate; vinyl pivalate; ethylene; butadiene; 4-dodecyl styrene; or 4-nonyl styrene; optionally together with units derived from itaconic acid; maleic acid; citraconic acid; acrylic acid; methacrylic acid; crotonic acid; di-esters and mono esters of unsaturated di-carboxylic acids with monohydric or polyhydric alcohols; allyl alcohol; vinyl alcohol; esters of unsaturated mono-carboxylic acids with polyhydric alcohols, e.g. 2-hydroxyethyl methacrylate; vinyl acetate; acrylonitrile; acrylamide; methacrylamide; N-(1,1-dimethyl-3-oxobutyl) acrylamide; N-mono or N,N-di-substituted derivatives of unsaturated amides, e.g. tertiary butyl acrylamide, N,N-dimethyl acrylamide, N-methylal acrylamide; N-methoxy methyl acrylamide; N-acetoxy methyl acrylamide; N-vinyl pyrrolidone or dimethyl amino-ethyl methacrylate.

Further alternative formulations for the polymeric component include polyvinylidene chloride or conveniently a copolymer or terpolymer of vinylidene chloride containing at least 35 mole percent of vinylidene chloride. Copolymers and terpolymers of vinylidene chloride may, for instance, be foremd with vinyl acetate, vinyl propionate; vinyl chloroacetate; vinyl chloride; vinyl bromide; methyl, isobutyl or chloroethyl methacrylate; methyl chloroacrylate; itaconic acid and the methyl, ethyl and butyl esters of itaconic acid; acrylonitrile; methacrylonitrile; styrene; and acrylic esters, such as methyl methacrylate, ethyl methacrylate, butyl methacrylate, methyl acrylate, ethyl acrylate, propyl acrylate and butyl acrylate, and acrylic and methacrylic acids. Suitable terpolymers of vinylidene chloride comprise 75 to 95 mole percent of vinylidene chloride, 4 to 20 mole percent of an acrylic ester such as methyl acrylate and 0.5 to 5 mole percent of itaconic acid.

The water permeable component of the subbing composition may consist of any suitable hydrophilic material base, such as gelatin and derivatives of gelatin, which will provide adequate adhesion to another layer, e.g. a light sensitive layer or a further subbing layer applied to the film.

The subbing composition according to the invention may be made up in an organic or aqueous medium for the polymeric component and the water permeable component. If an aqueous medium is used the polymeric component is generally present as a dispersion and the water permeable component as a solution. If an organic medium is used the polymeric component is generally present as a solution and the water permeable component as a dispersion. The subbing composition may be made up by adding the water permeable component, e.g. gelatin, to the polymeric component during the polymerisation of that component, i.e. it may be part of the polymerisation recipe. The mixture is then mixed with the organic or aqueous medium. The solution or dispersion may include other compatible additives which are commonly used in known polymeric subbing compositions or in known water permeable compositions, e.g. gelatin, subbing compositions. For instance additives which have a swelling or solvent action on the surface of the film may be included, e.g. chloro-substituted aliphatic acids, such as trichloroacetic acid; phenols and chloro-substituted phenols such as mono-, di-, and tri-chlorophenol; and aromatic alcohols such as resorcinol. Gelatin hardeners such as formalin may also be included. Other useful additives which include dispersing agents, antioxidants, and antiblocking agents may be used.

The organic or water medium must be removed by drying and this can be accomplished in the preheating for the subsequent stretching operation.

Preferably the amount by weight of the water permeable component does not exceed the amount of the polymeric component. The ratio of polymeric component to the water permeable component in the subbing composition, and indeed in the coating of the oriented and heat set film, is conveniently in the range 2:1 to 40:1 by weight, preferably 3.3:1 to 20:1 by weight (i.e. the amount of the water permeable component is 5 to 30 percent by weight of the polymeric component).

The subbing composition may conveniently contain 0.05 to 7 percent preferably 0.4 to 2 percent by weight of the water permeable component and 2.0 to 15.0 percent, preferably 5.0 to 12.0 percent by weight, of the polymeric component, the rest of the composition comprising the organic solvent or water and any additives employed.

The coat weight of the subbing coating applied to the polymeric film may be varied by altering the amounts of the polymeric component and the water permeable component in the subbing composition and/or the rate of coating. The applied coat weight on each side of the finished film, i.e. after drying, orientation and heat setting, is preferably in the range from 1 to 7 mg/dm$^2$.

It has been found according to one aspect of the invention that satisfactory adhesion is produced between the subbing layer and the polymeric film and also that satisfactory adhesion is produced between the subbing layer and a light sensitive layer such as a gelatino silver halide emulsion applied directly over it by any means known in the art. The present invention also relates to such photographic films obtained by applying a light sensitive layer to the film base.

Thus in this instance the present invention now makes it possible to eliminate 1) the pretreatment of the polymeric film surface which has often beem employed prior to subbing and 2) the multi stage subbing operations which have often been employed to apply a polymeric subbing layer and then a gelatin subbing layer, the latter being applied after the film has been biaxially oriented and heat set. By the present invention a subbing composition can be applied in a single operation during the manufacture of the polymeric film, thereby making it possible to carry the manufactured film direct to the application of the sensitive emulsion layer without requiring any intermediate subbing operation.

According to another aspect of the invention a conventional gelatin subbing composition may be applied over the polymeric/water permeable subbing layer of the film base after it has been heat set. Excellent adhesion is produced between the two subbing layers. The gelatin composition may be applied as part of a continuous process which includes the production of the polymeric film and its coating with the polymeric/water permeable subbing layer, the gelatin composition being applied after the film has been heat set. Alternatively the gelatin composition can be applied to the film base made according to the invention in an independent operation. A light sensitive layer such as a gelatino silver halide emulsion may be applied over the gelatin subbing layer to produce a photographic film. The invention also relates to such a photographic film.

In order to produce a satisfactory bond between the gelatin subbing layer and the polymeric subbing layer of a conventional subbed film it has been common practice to heat or season the film at 100° to 130°C for a residence time of 1 to 5 minutes. It has now been found that when a gelatin subbing layer is applied over the polymeric/water permeable layer of the film base according to the invention a satisfactory bond between the two can be obtained by using seasoning temperatures lower than 100°C and down to 80°C, preferably around 90°C for the same residence time, i.e. 1 to 5 minutes.

Polymeric film is generally susceptible to differential shrinkage across its area when heated at an elevated temperature. The extent of the differential shrinkage increases with an increase in the temperature and/or time of the thermal treatment. Accordingly, the use in the present invention of seasoning temperatures lower than normal reduces the differential shrinkage in the film with the result that the film is less distorted and more uniform in flatness.

The invention is further illustrated by the following non-limiting examples.

EXAMPLE 1

Polyethylene terephthalate was melt extruded from a slot die on to a rotating drum on which it was quenched to the amorphous state. The amorphous film was stretched at a temperature of about 80°C with a draw ratio of about 3.0:1 in the longitudinal direction between a set of slow rollers and a set of fast rollers. The film was then coated with a subbing composition, as specified below, by a reverse roll coater. The peripheral speed of the coater roll was 40 ft/min and the speed of the film was 25 ft/min. The coated film was dried and then passed into a stenter oven where it was stretched transversely at a draw ratio of about 3.0:1 while being heated at about 100°C. The coated film was heat set in a stenter oven at a temperature of about 200°C whilst being restrained from shrinkage in the longitudinal and transverse directions. The polyethylene terephthalate film had a thickness of 7 × 10$^{-3}$ inch and the coat weight of the subbing coating was 4 mg/dm$^2$ per side on the finished oriented and heat set film.

The polymeric component of the subbing composition consisted of a terpolymer of, by weight, 36.8 mole percent butadiene, 60.5 mole percent parts styrene and 2.7 mole percent itaconic acid.

This polymeric component was used to make the subbing coating having the following composition, measured in parts by weight:

10 parts Butadiene/styrene/itaconic acid copolymer
1 part Gelatin
1 part "Active" anionic emulsifier available under the Trade Name "Teepol" 610
88 parts Distilled Water.

A light sensitive layer comprising a gelatino silver halide emulsion was applied over the subbed film base. The material obtained was subjected to the following tests:

1. The product was split so as to sever the polymeric film and the applied coatings. Adhesive tape was applied along the severed edge and sharply peeled off while the film was dry. The adhesive tape test procedure was repeated eight times. The subbing and sensitive layers remained strongly adherent to each other and the polymeric film, with no tendency to crack or chip away. 2. A wet test simulating the developing, fixing and washing processes applied to the light sensitive layer was effected by soaking the film in the appropriate solutions in sequence under the temperatures and for the times typically used for these processes after which the coatings were penetrated to the polymeric film by scratching with a blunt point. The region surrounding the scratch was abraded with a sponge but the coatings remained strongly adherent to each other and the polymeric film. 3. The product was dried for 24 hours at room temperature and the first test repeated. There had been no deterioration in the adhesion of the subbing and sensitive layers to each other and to the polymeric film.

EXAMPLES 2 to 5

The procedure described in Example 1 was repeated to apply different subbing coatings to the polyethylene terephthalate film. The polymeric component of the subbing composition used in each example was the copolymer of 36.8/60.5/ 2.7 mole percent butadiene/styrene/itaconic acid. The Table below indicates the subbing composition employed (components measured in parts by weight) and the results obtained after applying the adhesion tests specified in Example 1.

TABLE

| Example | Subbing Composition | Results |
| --- | --- | --- |
| 2 | 7 parts Butadiene/styrene/itaconic acid copolymer<br><br>1.3 parts gelatin<br><br>0.7 part "Active" anionic emulsifier "Teepol" 610<br>91 parts distilled water | The subbing and light sensitive layers were strongly adherent to each other and the polymeric film. The adhesion was unaffected by the conditions of the tests applied |
| 3 | 10 parts Butadiene/styrene/itaconic acid copolymer<br><br>0.2 part gelatin<br>1 part "Active" anionic emulsifier "Teepol" 610<br>88.8 parts distilled water | The adhesion of the subbing composition to the polymeric film was strong and unaffected by the test conditions. The light sensitive layer bonded to the subbing composition but the adhesion was not as strong as that in Examples 1 and 2. |
| 4 | 10 parts Butadiene/styrene/itaconic acid copolymer<br><br>5 parts gelatin<br>1 part "Active" anionic emulsifier "Teepol" 610<br>84 parts distilled water | The adhesion between the subbing and light sensitive layers was strong and unaffected by the test conditions but the adhesion of the subbing layer to the polymeric film was not as strong as in Examples 1, 2 and 3. |
| 5 | 5 parts Butadiene/styrene/itaconic acid copolymer<br><br>1 part gelatin<br>0.5 part "Active" anionic emulsifier "Teepol" 610<br>93.5 parts distilled water | The subbing and light sensitive layers were strongly adherent to each other and the polymeric film. The adhesion was unaffected by the conditions of the tests. |

EXAMPLE 6

The heat-set subbed film base prepared in Example 2 was coated by a reverse roll coater with an aqueous gelatin composition having the following constitution, measured in parts by weight 2 parts gelatin
0.2 part formalin (40 percent by weight solution of formaldehyde)
97.8 parts water During coating the film base was transported past the roller at 25 ft/min and the roller had a peripheral speed of 70 ft/min.

The coated film base was seasoned by heating in an air oven for 3 minutes at 80°C. The seasoned gelatin coating had a coat weight of 3 mg/dm$^2$.

The test specified in Example 1 was applied to the subbed film base and it was found that a satisfactory strong adhesion existed between the polymeric/water permeable layer and the gelatin layer which was unaffected by the conditions of the test.

We claim:

1. A method of producing a photographic film base, which comprises casting a flat polymeric film, molecularly orienting the cast film by stretching it in at least one direction and coating the film with a subbing composition comprising a polymeric component and a water permeable component selected from the group consisting of gelatin and gelatin derivatives in the range of 3.3:1 to 20:1 by weight prior to the completion of the molecular orientation and heat setting the oriented and coated film.

2. A method according to claim 1, in which the polymeric film is a polyethylene terephthalate film.

3. A method according to claim 2, in which the cast film is biaxially oriented by stretching in its longitudinal and transverse directions in sequence, or vice versa, and the subbing composition is applied to the film after stretching in the first direction and before stretching in the second direction.

4. A method according to claim 1, in which the subbing composition is applied as a solution and is dried before the subsequent stretching operation.

5. A method according to claim 1, in which the subbing composition comprises 0.4 to 2 percent by weight of the water permeable component.

6. A method according to claim 1, in which the subbing composition comprises 5.0 to 12.0 percent by weight of the polymeric component.

7. A method according to claim 1, in which the polymeric component comprises a copolymer of butadiene with one or more comonomers chosen from acrylonitrile, styrene, methyl methacrylate methacrylic acid and itaconic acid.

8. A method according to claim 7 in which the polymeric component is a butadiene terpolymer comprising, by weight 23 parts of butadiene, 73 parts of styrene and 4 parts of itaconic acid.

9. A method according to claim 1, in which, a gelatin subbing layer is applied over the layer comprising the polymeric component and the water permeable component and the film base is heated at a temperature from 80° to 110°C to effect bonding between the two layers.

* * * * *